United States Patent
Nagaoka et al.

(10) Patent No.: US 7,196,991 B2
(45) Date of Patent: Mar. 27, 2007

(54) OPTICAL DISK APPARATUS, METHOD FOR CALCULATION OF AMOUNT OF LENS SHIFT, PROGRAM AND MEDIUM

(75) Inventors: Junji Nagaoka, Takatsuki (JP); Seiji Nishiwaki, Kobe (JP); Kazuo Momoo, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 598 days.

(21) Appl. No.: 09/994,335

(22) Filed: Nov. 26, 2001

(65) Prior Publication Data

US 2002/0080692 A1 Jun. 27, 2002

(30) Foreign Application Priority Data

Nov. 24, 2000 (JP) .............................. 2000-357457

(51) Int. Cl.
*G11B 7/00* (2006.01)
(52) U.S. Cl. .............................. 369/53.19; 369/44.32; 369/53.33
(58) Field of Classification Search ............. 369/44.32, 369/53.19, 44.41, 53.23, 53.28
See application file for complete search history.

(56) References Cited

U.S. PATENT DOCUMENTS 5,828,637 A * 10/1998 Kim ..................... 369/44.32

FOREIGN PATENT DOCUMENTS

JP 2000-163765 6/2000

OTHER PUBLICATIONS

English Abstract Translation of JP-2000-163765.

* cited by examiner

*Primary Examiner*—Andrea Wellington
*Assistant Examiner*—Jorge L. Ortiz-Criado
(74) *Attorney, Agent, or Firm*—RatnerPrestia

(57) ABSTRACT

An optical disk apparatus has an optical head having a lens of converging light from a light source onto an optical disk and a photodetector for detecting the light thus converged and then reflected from the optical disk. A tracking error signal is generated in order to perform tracking control on the basis of the detected light. A disk tilt DT is detected to indicate the amount of tilt of the optical head relative to the optical disk. A calculation is performed to calculate a lens shift LS indicating the amount of shift of the lens relative to the optical head, according to a predetermined rule on the basis of the generated tracking error signal and the detected disk tilt DT.

13 Claims, 9 Drawing Sheets

Fig. 2 (a)　Relation between LS and TE/TS
Fig. 2 (b)　Relation between DT and TE/TS
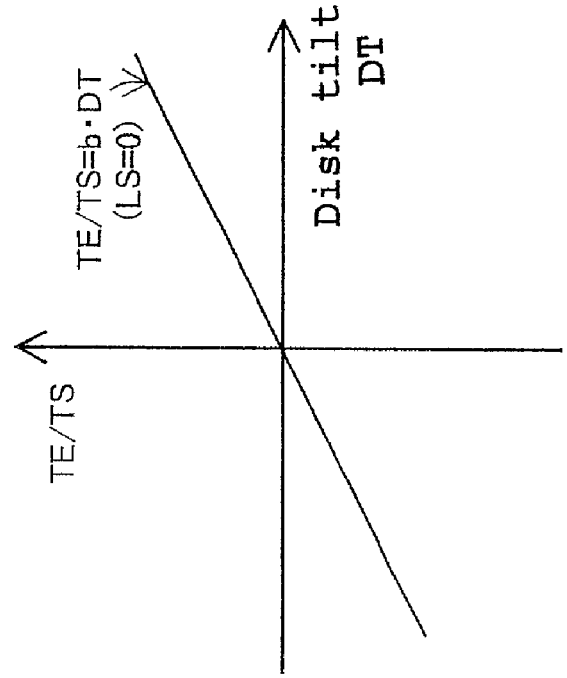
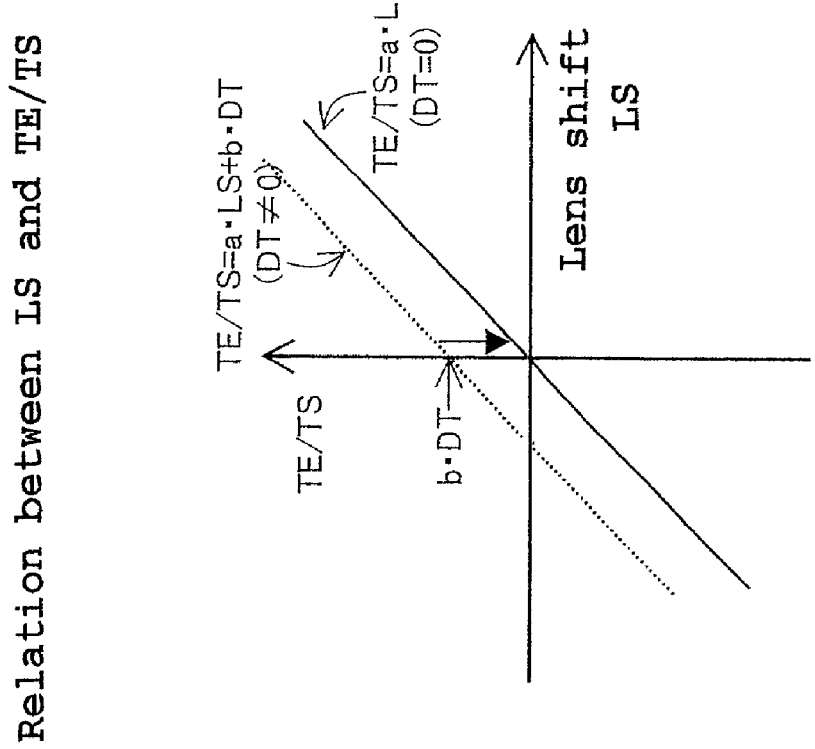

Fig. 3 (a)  Case of LS≠0 and DT≠0
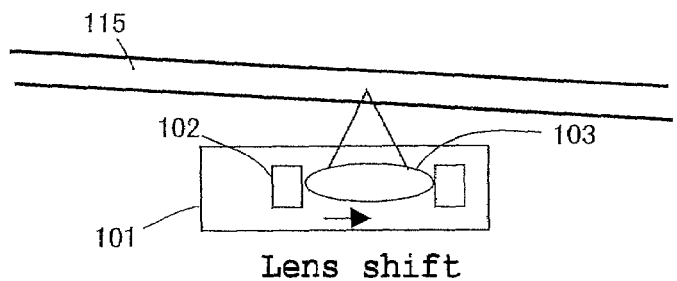
Lens shift
Fig. 3 (b)  Case of LS≠0 and DT=0
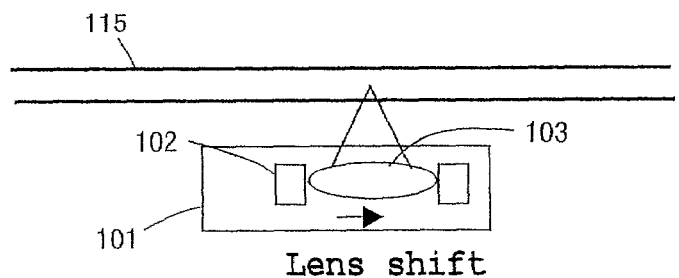
Lens shift
Fig. 3 (c)  Case of LS=0 and DT=0
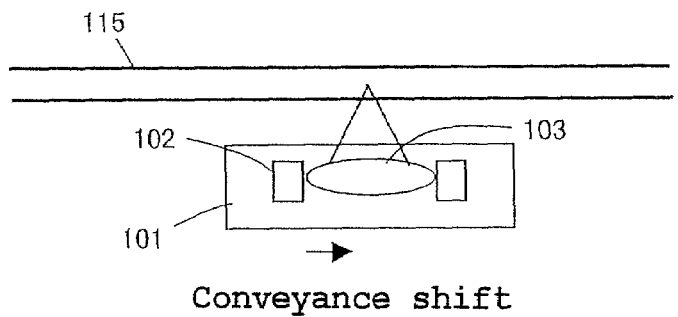
Conveyance shift Case of mirror region Case of data region Case of LS≠0 and LT=k·DT Lens shift Case of LS=0 and LT=k·DT Conveyance shift

OPTICAL DISK APPARATUS, METHOD FOR CALCULATION OF AMOUNT OF LENS SHIFT, PROGRAM AND MEDIUM

BACKGROUND OF THE INVENTION

1. Field of the Invention

The present invention relates to an optical disk apparatus, and a method, a program, and a medium for calculating the amount of lens shift, which are applied, for example, in a drive apparatus comprising an optical head for recording onto and reproducing from an optical disk.

2. Related Art of the Invention

With the spread of optical disks in recent years, much attention is focused on the technique of carrying out tracking control with detecting and correcting the amount of lens shift for the purpose of more stable recording onto and reproducing from an optical disk.

The configuration of a prior art optical disk apparatus is described below with reference to FIG. 9. FIG. 9 is a block diagram schematically showing an example of an optical disk apparatus which carries out tracking control with detecting and correcting the amount of lens shift as described above.

An optical head 901 is means of converging laser light from a laser diode 904 serving as an example of a light source by means of a converging lens 903 serving as an example of light converging means, and of irradiating with it an optical disk 915 which is driven to rotate. The optical head 901 is also means of detecting the reflected light from the optical disk 915 by means of a photodetector 905 and thereby outputting the information recorded on the optical disk 915 and a detection signal used for focus control and tracking control.

The optical head 901 comprises driving means 902 of moving the converging lens 903 in a disk radius direction (tracking direction) and in a direction (focusing direction) approaching or departing the disk surface. Further, the optical head 901 can be conveyed in a disk radius direction by a conveying means 912.

The operation of the prior art optical disk apparatus is described below with reference to FIG. 9.

A detection signal output from the optical head 901 is amplified and processed by an RF amplifier 906, thereby being provided as a focus error signal and a tracking error signal to a servo processor 909.

The servo processor 909 controls an FC/TR driver 916 on the basis of the focus error signal and the tracking error signal from the RF amplifier 906. The FC/TR driver 916 outputs a drive signal for driving the driving means 902 which supports the converging lens 903 in the optical head 901.

As such, focus control and tracking control are carried out so that focusing and tracking are achieved appropriately on the optical disk 915.

The detection of the amount of lens shift is carried out either (1) using the DC component and the low-frequency component of the tracking error signal or (2) by a sensor (TPS) which in not shown in the figure but may be provided for detecting the amount of movement in the tracking direction of the driving means 902.

A conveyance error signal is generated from the detected amount of lens shift, whereby a conveyance driver 911 is controlled so that the conveying means 912 is driven. Accordingly, the optical head 901 is conveyed in the disk radius direction.

As such, conveyance control is carried out so as to correct the lens shift caused by track jumping, off-centering of the optical disk, and the like.

Nevertheless, in the above-mentioned prior art method in which the amount of lens shift is detected using the DC component and the low-frequency component of the tracking error signal, the error is large and has caused a difficulty in accurate detection of the amount of lens shift.

Further, in the method in which a TPS is provided for detecting the amount of lens shift, an extra component cost occurs, and errors are caused by a variation and a temperature-dependent drift in the sensor components, and the like. This has similarly caused a difficulty in accurate detection of the amount of lens shift.

SUMMARY OF THE INVENTION

Considering the above-mentioned problems in the prior art, an object of the invention is to provide: an optical disk apparatus in which the amount of lens shift is accurately obtained and hence stable recording and reproduction are achieved; and a method, a medium, and an informational set for calculating the amount of lens shift.

One aspect of the present invention is an optical disk apparatus comprising:

an optical head having: lens means of converging light from a light source onto an optical disk; and a photodetector for detecting the light thus converged and then reflected from said optical disk;

tracking error signal generating means of generating a tracking error signal in order to perform tracking control on the basis of said detected light;

detecting means of detecting a disk tilt DT indicating the amount of tilt of said optical head relative to said optical disk; and calculating means of calculating a lens shift LS indicating the amount of shift of said lens means relative to said optical head, according to a predetermined rule on the basis of said generated tracking error signal and said detected disk tilt DT.

Another aspect of the present invention is an optical disk apparatus, wherein said predetermined rule is expressed by the following Equation 1

$$T = a \cdot LS + b \cdot DT \qquad \text{[Equation 1]}$$

which is satisfied among: the value T of said generated tracking error signal; said detected disk tilt DT; and said lens shift LS to be calculated; when predetermined constants a and b are given.

Still another aspect of the present invention is an optical disk apparatus, wherein said detecting means can detect said disk tilt DT.

Yet still another aspect of the present invention is an optical disk apparatus comprising optical head driving means of driving said optical head within the cross section in a radius direction of said optical disk on the basis of the result of said detection of said disk tilt DT, wherein when said tracking error signal is detected, said optical head is driven so that said detected disk tilt DT substantially becomes zero.

Still yet another aspect of the present invention is an optical disk apparatus, wherein:

said detecting means can detect the reproduction state of the information from said optical disk;

said optical disk apparatus comprises optical head driving means of driving said optical head within the cross section in a radius direction of said optical disk on the basis of the result of said detection of said reproduction state of said information; and when said tracking error signal is detected, said optical head is driven so that said reproduction state of said information becomes optimum.

A further aspect of the present invention is an optical disk apparatus, wherein:

said detection of said reproduction state of said information indicates the detection of the amplitude and/or the jitter of a signal used in the reproduction of said information; and said being driven such that said reproduction state of said information becomes optimum indicates being driven so that said amplitude is maximized and/or said jitter is minimized and thereby so that said disk tilt DT substantially becomes zero.

A still further aspect of the present invention is an optical disk apparatus, wherein:

said detecting means can detect (1) a lens tilt LT indicating the amount of tilt of said lens means relative to said optical head and (2) the reproduction state of the information from said optical disk;

said optical disk apparatus comprises lens driving means of driving the lens center axis of said lens means within the cross section in a radius direction of said optical disk on the basis of the result of said detection;

in order to detect said disk tilt DT, said lens means is driven so that said reproduction state of said information becomes optimum; and said disk tilt DT is detected on the basis of said detected lens tilt LT in the situation that said lens center axis of said lens means has been driven so that said reproduction state of said information becomes optimum.

A yet further aspect of the present invention is an optical disk apparatus, wherein:

said detection of said reproduction state of said information indicates the detection of the amplitude and/or the jitter of a signal used in the reproduction of said information;

said being driven so that said reproduction state of said information becomes optimum indicates being driven such that said amplitude is maximized and/or said jitter is minimized; and after said lens tilt LT is detected in order to detect said disk tilt DT, said tracking error signal is detected in the situation that said lens means has been driven so that said lens tilt LT substantially becomes zero.

A still yet further aspect of the present invention is an optical disk apparatus, wherein said tracking error signal is detected in the mirror region of said optical disk.

An additional aspect of the present invention is an optical disk apparatus, wherein said tracking error signal is detected by detecting the average level of said tracking error signal in the OFF-state of tracking control in the data region in the vicinity of the disk radius position of said optical disk where said disk tilt DT or said lens tilt LT is detected.

A still additional aspect of the present invention is an optical disk apparatus comprising conveying means of conveying said optical head in a radius direction of said optical disk on the basis of said calculated lens shift LS.

A yet additional aspect of the present invention is a method of calculating the amount of lens shift comprising:

a converging step of converging light from a light source onto an optical disk by means of lens means;

a detecting step of detecting the light converged onto said optical disk and then reflected from said optical disk;

a generating step of generating a tracking error signal in order to perform tracking control on the basis of said detected light;

a disk tilt detecting step of detecting a disk tilt DT indicating the amount of tilt of an optical head having said lens means relative to said optical disk; and a calculating step of calculating a lens shift LS indicating the amount of shift of said lens means relative to said optical head, according to a predetermined rule on the basis of said generated tracking error signal and said detected disk tilt DT.

A still yet additional aspect of the present invention is a program for causing a computer to serve as all or part of said tracking error signal generating means, said detecting means, and said calculating means of said optical disk apparatus.

A supplementary aspect of the present invention is a program for causing a computer to carry out all or part of said generating step, said disk tilt detecting step, and said calculating step of said method of calculating the amount of lens shift.

A still supplementary aspect of the present invention is a computer-processable medium carrying a program for causing a computer to serve as all or part of said tracking error signal generating means, said detecting means, and said calculating means of said optical disk apparatus.

A yet supplementary aspect of the present invention is a computer-processable medium carrying a program for causing a computer to carry out all or part of said generating step, said disk tilt detecting step, and said calculating step of said method of calculating the amount of lens shift.

BRIEF DESCRIPTION OF THE DRAWINGS

FIG. 2(a) is a diagram for the description of the relation between LS and TE/TS in Embodiment 1 of the invention. FIG. 2(b) is a diagram for the description of the relation between DT and TE/TS.

FIG. 3(a) is a diagram for the description of the state with LS≠0 and DT≠0 in Embodiment 1 of the invention. FIG. 3(b) is a diagram for the description of the state with LS≠0 and DT=0. FIG. 3(c) is a diagram for the description of the state with LS=0 and DT=0.

Figure 1:
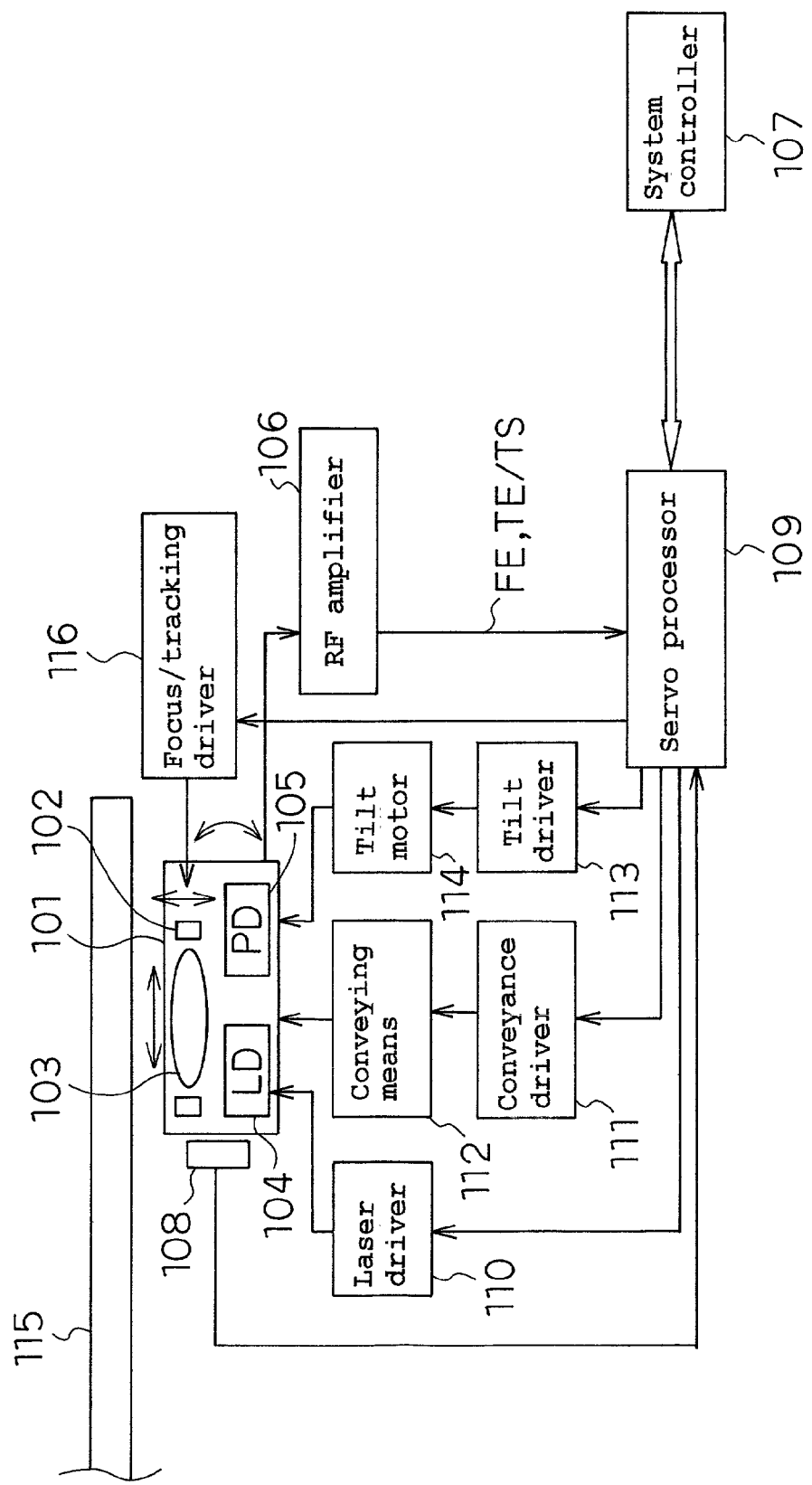
FIG. 1 is a block diagram of an optical disk apparatus according to Embodiment 1 of the invention.

DESCRIPTION OF THE REFERENCE NUMERALS 101, 901 Optical head
102, 902 Driving apparatus
103, 903 Converging lens
104, 904 Laser diode
105, 905 Photodetector
106, 906 RF amplifier
107 System controller
108 Tilt sensor
109, 909 Servo processor
110, 910 Laser driver
111, 911 Conveyance driver
112, 912 Conveying means
113 Tilt driver
114 Tilt motor
115, 915 Optical disk
116, 916 Focus/tracking driver
117 Lens tilt driver
501 Signal amplitude detection circuit
801 Reproduction jitter detection circuit

DETAILED DESCRIPTION OF THE INVENTION

The embodiments of the invention are described below with reference to the drawings.

The invention is characterized in that the amount of lens shift LS is accurately detected and that the control is carried out such that the lens shift becomes zero. This point is described in detail in the latter part of each of Embodiments 1–3.

Embodiment 1

The configuration and the operation of an optical disk apparatus according to Embodiment 1 is described below with reference to FIG. 1 which is a block diagram of the optical disk apparatus according to the present embodiment. Here, with describing the operation of the optical disk apparatus, described also is an embodiment of a method of calculating the amount of lens shift according to the invention.

Laser light emitted from a laser diode 104 is converged and guided onto an optical disk 115 by a converging lens 103. The reflected light information from the optical disk 115 is detected by a photodetector 105, and then provided to an RF amplifier 106 in the form of an electric signal corresponding to the amount of the received light.

The RF amplifier 106 performs matrix operation/amplification processing, thereby generating a focus error signal FE, a tracking error signal TE/TS and the like.

The photodetector 105 has a first light-receiving region and a second light-receiving region which are substantially separated from each other by a dividing line corresponding to the rotational direction of the optical disk 115. The tracking error signal TE/TS is generated as a quotient of a difference signal TE over a sum signal TS of the photodetector 105. (An identical symbol is used both in order to indicate a signal itself such as the tracking error signal and in order to indicate the value of the signal, in some cases hereafter.) Further, the signal value of the tracking error signal TE/TS in the present embodiment corresponds to the value T of the tracking error signal in the invention.

The focus error signal FE and the tracking error signal TE/TS output from the RF amplifier 106 as described above are provided to a servo processor 109.

On the basis of the focus error signal FE and the tracking error signal TE/TS, the servo processor 109 generates a focus drive signal and a tracking drive signal, thereby providing the signals to an FC/TR driver 116. The FC/TR driver 116 then drives a drive apparatus 102 which is means of moving the converging lens 103. The drive apparatus 102 comprises, for example, a focus coil, a tracking coil, a magnet, and the like. Then, the currents flowing through the focus coil and the tracking coil are controlled so that the converging lens 103 is driven in the focus direction and the tracking direction, whereby focus control and tracking control are carried out.

The servo processor 109 generates a conveyance drive signal, for example, on the basis of a conveyance error signal obtained as the low-frequency component of the tracking error signal TE/TS, or alternatively, according to the search execution control of a system controller 107, and then provides the signal to a conveyance driver 111. The conveyance driver 111 drives conveying means 112 on the basis of the conveyance drive signal, thereby causing an optical head 101 to slide in the radius direction of the optical disk 115.

The servo processor 109 is means of calculating the lens shift LS according to a predetermined rule on the basis of a generated tracking error signal and a detected disk tilt DT as described later. The disk tilt DT indicates the amount DT of the tilt of the optical head 101 relative to the optical disk 115.

The light emission of the laser diode 104 is driven by a laser driver 110. At this time, the servo processor 109 generates a laser drive signal on the basis of an instruction from the system controller 107, thereby causing the light emission of the laser diode 104.

A tilt sensor 108 detects the amount DT (referred to as a disk tilt DT, hereafter) of the tilt of the optical head 101 relative to the optical disk 115, thereby outputting the signal to the servo processor 109.

The servo processor 109 drives a tilt driver 113 and thereby drives a tilt motor 114. Accordingly, the optical head 101 is moved in the inclination direction in the disk radius direction, whereby the disk tilt DT can be changed. Thus, the state with the disk tilt DT=0 can be achieved. As such, in Embodiment 1, used is a head tilting scheme in which the optical head 101 is tilted.

In place of the scheme that the state with the disk tilt DT=0 is detected by the tilt sensor 108, another configuration may be used as described later in Embodiments 2 and 3. That is, the state with the disk tilt DT=0 may be achieved by either (1) maximizing the amplitude of the reproduced signal or (2) minimizing the reproduced jitter, in each of which the reproduction performance is optimized.

A feature of the present embodiment, that is, the detection of the amount of lens shift LS is described below in detail with reference to FIGS. 2(a), 2(b), and 3(a)–3(c). FIG. 2(a) is a diagram illustrating the relation between LS and TE/TS, while FIG. 2(b) is a diagram illustrating the relation between DT and TE/TS. FIG. 3(a) is a diagram illustrating the state with LS≠0 and DT≠0, while FIG. 3(b) is a diagram illustrating the state with LS≠0 and DT=0. FIG. 3(c) is a diagram illustrating the state with LS=0 and DT=0.

As shown in FIGS. 2(a) and 2(b), the present inventors have found that the value of the tracking error signal TE/TS is expressed by the following Equation 2 for specific values of lens shift LS and disk tilt DT, using coefficients a and b which are proper to the head.

$$TE/TS = a \cdot LS + b \cdot DT \quad \text{[Equation 2]}$$

As described above, in the prior art, the lens shift LS was detected using only the DC component and the low-frequency component of the tracking error signal, and this has caused a large error. In the past, merely a possibility has been understood that the DC component of the tracking error signal maybe influenced somewhat by a component generated by the amount DT (disk tilt DT) of the tilt of the optical head 901 relative to the optical disk 915. Nevertheless, there has been no detailed understanding to what extent the influence needs to be taken into consideration. The present inventors have conceived the idea that the error occurred in the prior art is caused by neglecting the influence of the disk tilt DT. Then, assuming the above-mentioned Equation 2, the experimental values were well reproduced. As a result, it has been found that the amount of lens shift LS is detected accurately when the disk tilt DT is taken into consideration according to Equation 2.

Here, in the present embodiment, the head tilting scheme is used, and hence the amount corresponding to the lens tilt LT described later is zero. Accordingly, the above-mentioned Equation 2 holds always.

According to Equation 2, for example, in the state with the disk tilt DT=0, the value of the tracking error signal TE/TS is proportional to the lens shift LS. The above-mentioned relation is satisfied, for example, when a=0.34 (1/mm), b=0.035 (1/deg), TE/TS=0.041, LS=0.1 (mm), and DT=0.2 (deg).

For the easiness of understanding, the control operation based on the above-mentioned findings is sequentially described below.

Starting from the state with the lens shift LS≠0 and disk tilt DT≠0 as shown in FIG. 3(a), the tilt motor 114 is driven so that the optical head 101 is tilted in the disk radius direction.

Then, when the state with the disk tilt DT=0 is achieved as shown in FIG. 3(b), the relation between the tracking error signal TE/TS and the lens shift LS is expressed by the following Equation 3 as shown in FIG. 2(a).

$$TE/TS = a \cdot LS \quad \text{[Equation 3]}$$

Accordingly, by measuring the value of the tracking error signal TE/TS in this state, the servo processor 109 obtains LS, and then corrects the lens shift on the basis of the obtained LS.

More specifically, after the execution of the tracking control, on the basis of the detected lens shift LS, the conveying means 112 carries out the slide movement (conveyance shift) of the optical head 101 by the amount corresponding to the lens shift LS in the appropriate direction for lens shift correction. As such, the lens shift correction is carried out on the converging lens 103. Here, when the tracking control is ON, the converging lens 103 is fixed in order to follow the tracking, and hence does not undergo the slide movement together with the optical head 101. Thus, the lens shift can be corrected in the above-mentioned manner.

In Embodiment 1, the head tilting scheme is used. This permits the realization of a state free from a lens shift as shown in FIG. 3(c), and hence the continuation of stable tracking control.

The measurement of the value of the above-mentioned tracking error signal TE/TS is described below in detail for the case of a mirror region and for the case of a data region with reference to FIGS. 4(a) and 4(b), respectively. FIG. 4(a) is a diagram for the description of the TE/TS level in a mirror region, while FIG. 4(b) is a diagram for the description of the TE/TS level in a data region.

In case that a mirror region is provided in the optical disk, the tracking error signal TE/TS to be detected in the mirror region is detected as a DC level as shown in FIG. 4(a). Accordingly, the tracking error signal TE/TS can be detected within a smaller error in the mirror region in the optical disk.

In case that no mirror region is provided in the optical disk, the tracking error signal TE/TS is detected in the data region of the optical disk. In this case, a groove-traverse signal appears in the waveform of the tracking error signal TE/TS as shown in FIG. 4(b). However, even in this case, using a low-pass filter (LPF), or alternatively by a digital processing in the servo processor 109 and the like, the DC level of the groove-traverse signal can be detected, whereby the tracking error signal TE/TS is detected similarly to the case of a mirror region.

When the tracking error signal TE/TS is detected in the data region of the optical disk, it is unnecessary to move the optical head 101 so as to detect the tracking error signal TE/TS in the mirror region of the optical disk. Accordingly, even in case of an optical disk having a mirror region within the disk, the tracking error signal TE/TS may be detected in the data region of the optical disk.

In case of an optical disk in which a mirror region is located in a part (for example, a part between an address region and a data region) within one turn in the data region, the mirror region within one turn can be extracted solely, and the value of the tracking error signal TE/TS may be detected in that part.

In case of a data region, the tracking control is turned ON when disk tilt DT=0, whereby the optical head 101 is slid such that the tracking error signal TE/TS=0. In this case, the amount of this slide movement may be detected as the value of the lens shift.

Further, the tracking error signal TE/TS may be detected by measuring the average level of the tracking error signal TE/TS in the OFF state of the tracking control in a data region in the vicinity of the disk radius position where the disk tilt DT or the lens tilt LT is detected.

Figure 4:
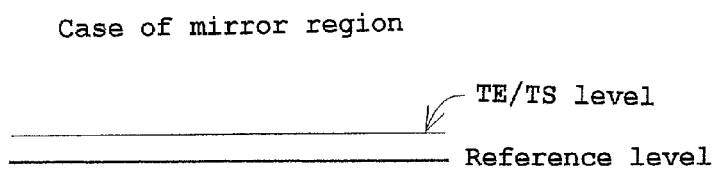
FIG. 4(a) is a diagram for the description of the TE/TS level in a mirror region in Embodiment 1 of the invention.
FIG. 4(b) is a diagram for the description of the TE/TS level in a data region.
Figure 4:
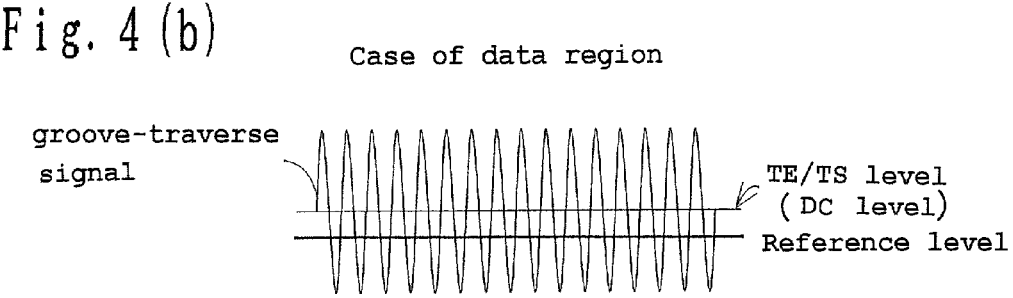

In FIG. 4, for simplicity, an AC-like variation appearing in the tracking error signal TE/TS level in synchronization with each revolution of the disk has not been considered substantially. However, even in case that such an AC-like variation occurs due to a vibration in the disk surface, the DC level of the tracking error signal TE/TS can be detected using a low-pass filter (LPF), or alternatively by a digital processing in the servo processor 109 and the like.

In the present embodiment, the tracking error signal TE/TS has been detected by an operational processing in the RF amplifier 106. However, the tracking error signal TE/TS may be detected by a digital operational processing in the servo processor 109. Further, the scheme of circuit and the scheme of signal detection are not restricted to these.

Furthermore, the lens shift LS may be calculated by detecting the disk tilt DT and the tracking error signal TE/TS and according to the relation of Equation 2, in the situation that the disk tilt DT is not necessarily zero.

Embodiment 2

The configuration and the operation of an optical disk apparatus according to Embodiment 2 is described below with reference to FIG. 5 which is a block diagram of the optical disk apparatus according to the present embodiment.

Here, with describing the operation of the optical disk apparatus, described also is an embodiment of a method of calculating the amount of lens shift according to the invention.

In contrast to the above-mentioned Embodiment 1 having adopted the head tilting scheme in which the optical head 101 is tilted, Embodiment 2 adopts a lens tilting scheme in which the converging lens 103 is tilted. Further, in Embodiment 2, (1) the value of the disk tilt DT is obtained from the value of the lens tilt LT realizing the optimum reproduction performance by monitoring the signal amplitude, (2) the value of the tracking error signal TE/TS is measured after the state is returned to LT=0, and (3) the target value of the lens shift LS is obtained. The other points are similar to those in Embodiment 1, and hence the description is omitted.

Figure 5:
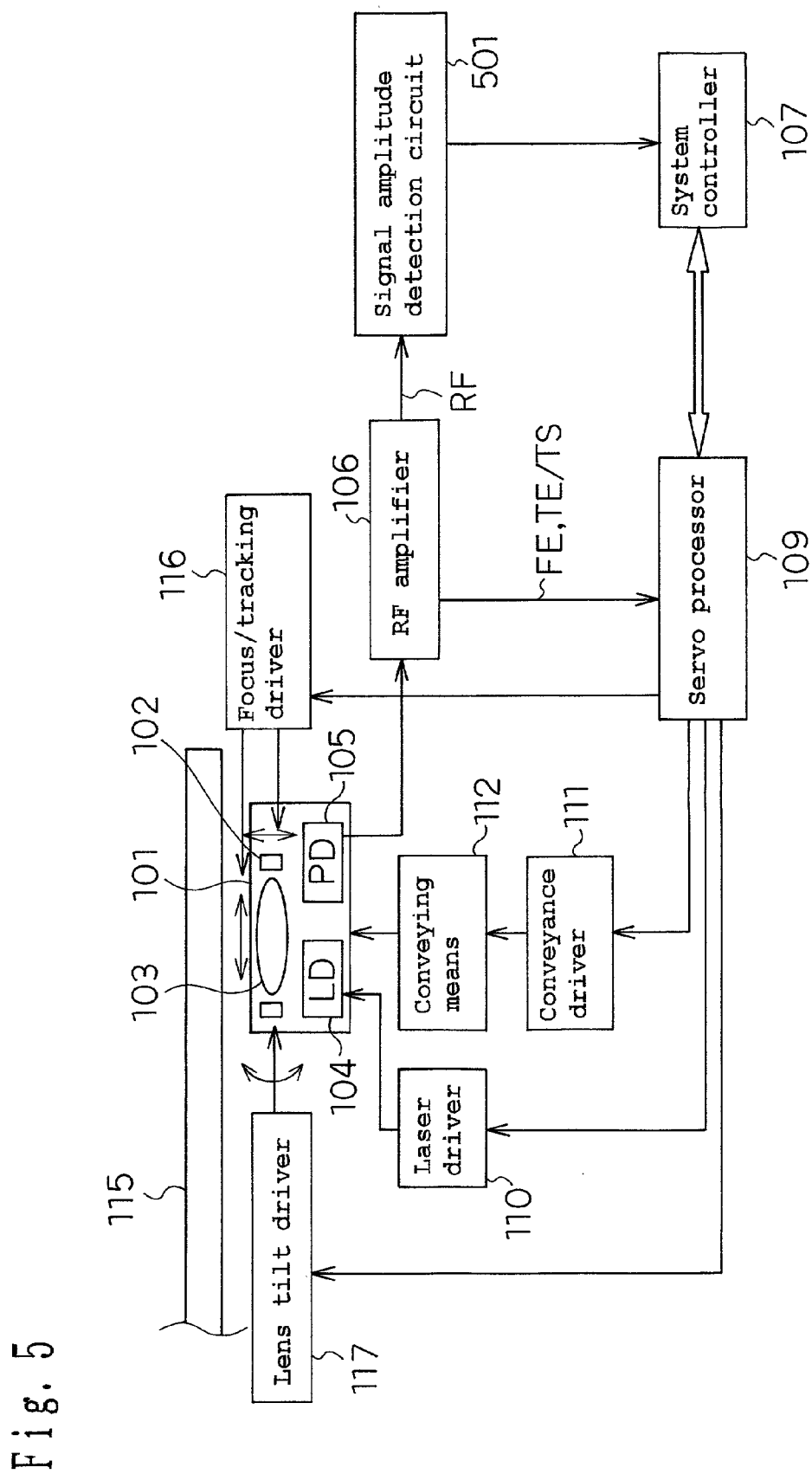
FIG. 5 is a block diagram of an optical disk apparatus according to Embodiment 2 of the invention.

In FIG. 5, the signal amplitude of an RF signal output from an RF amplifier 106 is detected by a signal amplitude detection circuit 501, and the result is output to a system controller 107.

The system controller 107 outputs a tilt control signal to a servo processor 109. The servo processor 109 outputs to an LT driver 117 a tilt drive signal corresponding to the tilt control signal.

Figure 6:
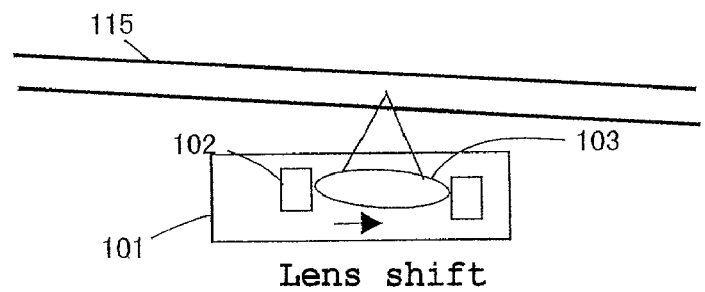
FIG. 6(a) is a diagram for the description of the state with LS≠0 and LT=k·DT in Embodiment 2 of the invention.
FIG. 6(b) is a diagram for the description of the state with LS=0 and LT=k·DT.
Figure 6:
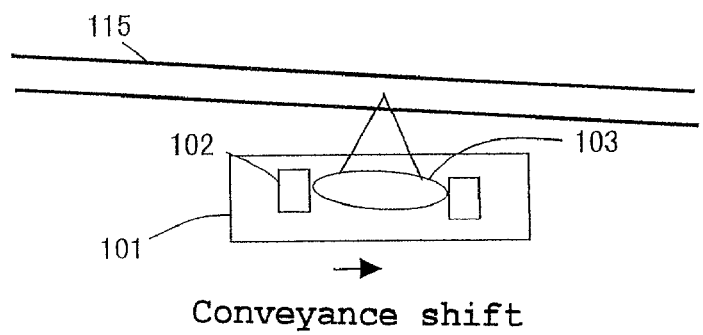
Figure 7A:
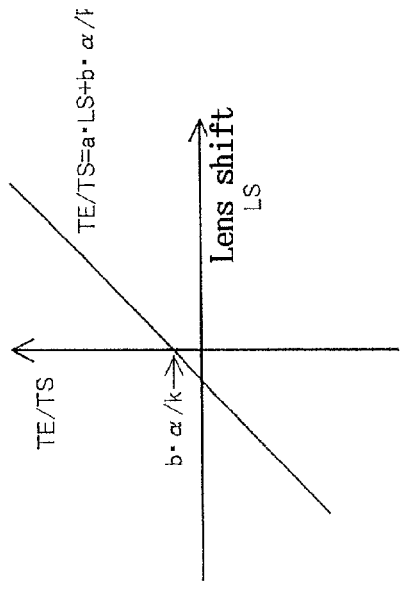
FIG. 7(a) is a diagram for the description of the relation between LT and DT in Embodiment 2 of the invention.
Figure 7C:
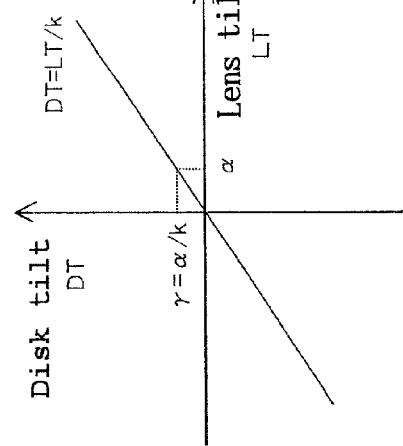
FIG. 7(c) is a diagram for the description of the relation between LT and signal amplitude.
Figure 7B:
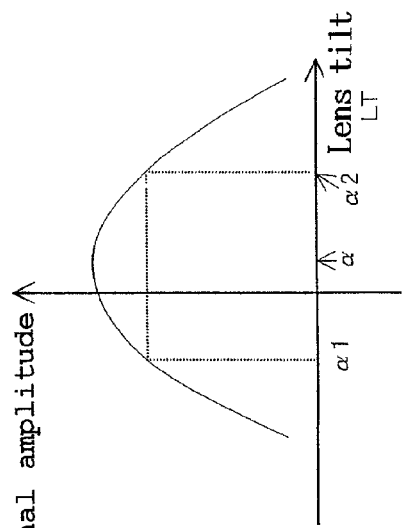
FIG. 7(b) is a diagram for the description of the relation between LS and TE/TS.

A feature of the present embodiment, that is, the detection of the lens shift LS by obtaining the value of DT from the value of LT by monitoring the signal amplitude is described below in detail with reference to FIGS. 6(*a*), 6(*b*), and 7(*a*)–7(*c*). FIG. 6(*a*) is a diagram illustrating the state with LS≠0 and LT=k·DT, while FIG. 6(*b*) is a diagram illustrating the state with LS=0 and LT=k·DT. FIG. 7(*a*) is a diagram illustrating the relation between LT and DT, while FIG. 7(*b*) is a diagram illustrating the relation between LS and TE/TS.

The LT driver 117 drives the rotation of a drive apparatus 102 by a predetermined rotational angle in a predetermined rotational direction on the basis of the input tilt drive signal, thereby causing a rotational movement of a converging lens 103 in the inclination direction in the disk radius direction.

By virtue of this, the system controller 107 can detect the signal amplitude corresponding to the amount LT (referred to as a lens tilt LT, hereafter) of the tilt of the converging lens 103, and accordingly detect the value α of the lens tilt LT causing the maximum signal amplitude which indicates the optimal reproduction performance. The positional relation between the optical disk 115 and the converging lens 103 at that time is shown in FIG. 6(*a*).

The value γ of the disk tilt DT occurring at that time is obtained by the following Equation 4 with the value α of the lens tilt LT causing the maximum signal amplitude and a coefficient k proper to the optical head.

$$\gamma = \alpha/k \qquad \text{[Equation 4]}$$

This is because at the maximum signal amplitude, the disk tilt DT and the lens tilt LT obey the relation LT=k·DT as shown in FIG. 7(*a*).

As is seen from the description in the above-mentioned Embodiment 1, when the disk tilt DT=γ=α/k, the relation between the lens shift LS and the tracking error signal TE/TS is expressed by the following Equation 5 which is drawn in the graph of FIG. 7(*b*).

$$TE/TS = a \cdot LS + b \cdot \alpha/k \qquad \text{[Equation 5]}$$

Here, this relation holds only when LT=0. Accordingly, when the value β of the tracking error signal TE/TS is measured after the state is returned to LT=0, the relation of the following Equation 6 is obtained among the lens shift LS, the values α and β, and coefficients a, b, and k proper to the optical head. This Equation 6 gives the lens shift LS.

$$\beta = a \cdot LS + b \cdot \alpha/k \qquad \text{[Equation 6]}$$

Here, since the disk tilt DT indicates the amount of the relative tilt between the optical disk and the optical head, and hence is invariant even when the lens is tilted such that LT=0.

On the basis of the LS obtained as described above, the lens shift correction is carried out similarly to the above-mentioned case. Since the lens tilting scheme is used in Embodiment 2, obtained is a state free from a lens shift as shown in FIG. 6(*b*).

In place of the detection of the value α of the lens tilt LT causing the maximum signal amplitude, values α1 and α2 of the lens tilt LT causing a reduced signal amplitude in comparison with the maximum signal amplitude may be detected as shown in FIG. 7(*c*) illustrating the relation between the LT and the signal amplitude. Then, an approximate average value between the values α1 and α2 of the lens tilt LT is obtained as the value α of the lens tilt LT realizing the optimum reproduction performance.

Also in the lens tilting scheme, as described above in Embodiment 1, a tilt sensor 108 may be provided in order to detect the value γ of the disk tilt DT. In this case, the lens shift LS is obtained by the following Equation 7 expressing the relation between the lens shift LS, the value β of the tracking error signal TE/TS, coefficients a and b proper to the optical head.

$$\beta = a \cdot LS + b \cdot \gamma \qquad \text{[Equation 7]}$$

Embodiment 3

Figure 8:
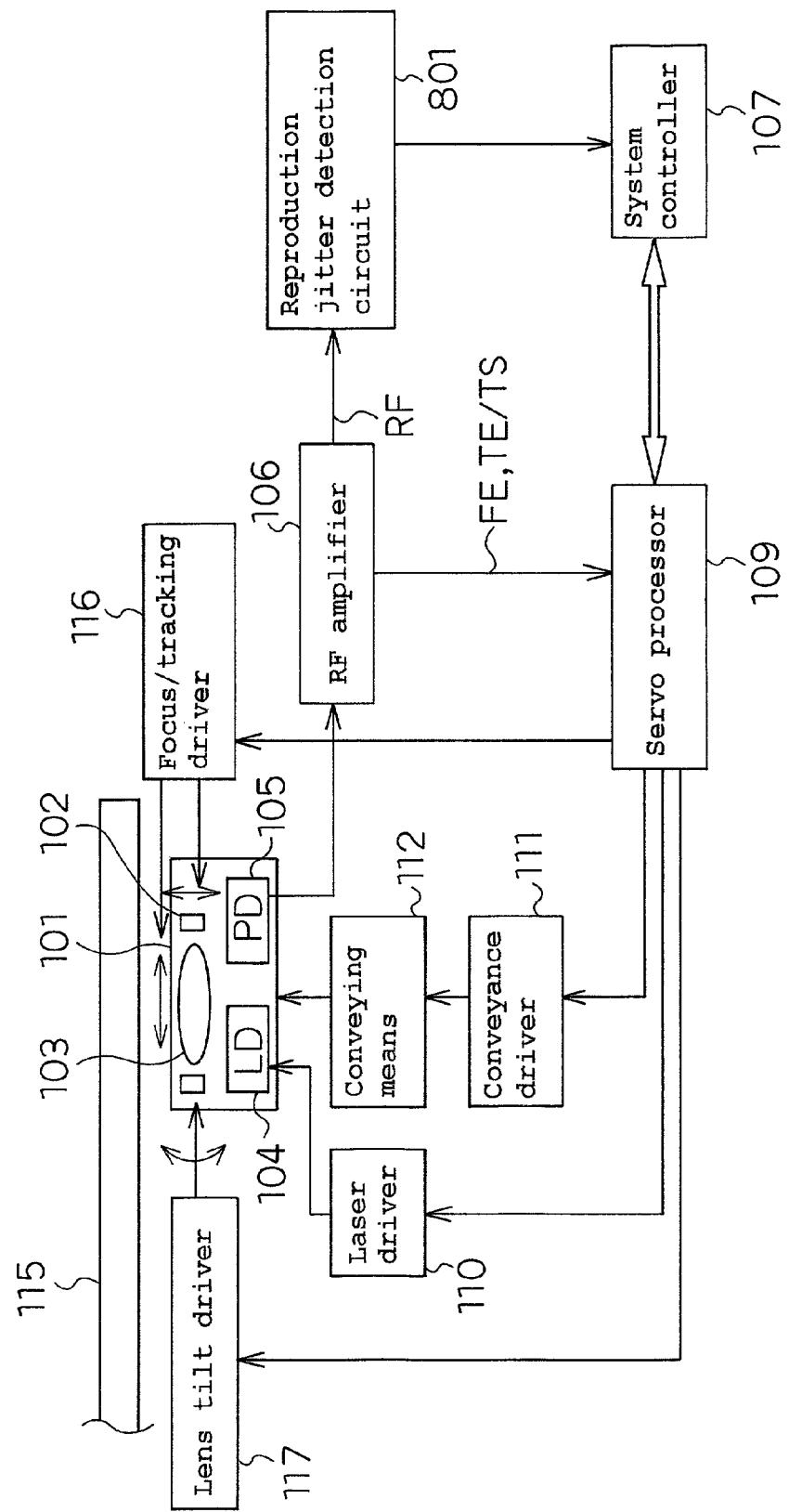
FIG. 8 is a block diagram of an optical disk apparatus according to Embodiment 3 of the invention.
Figure 9:
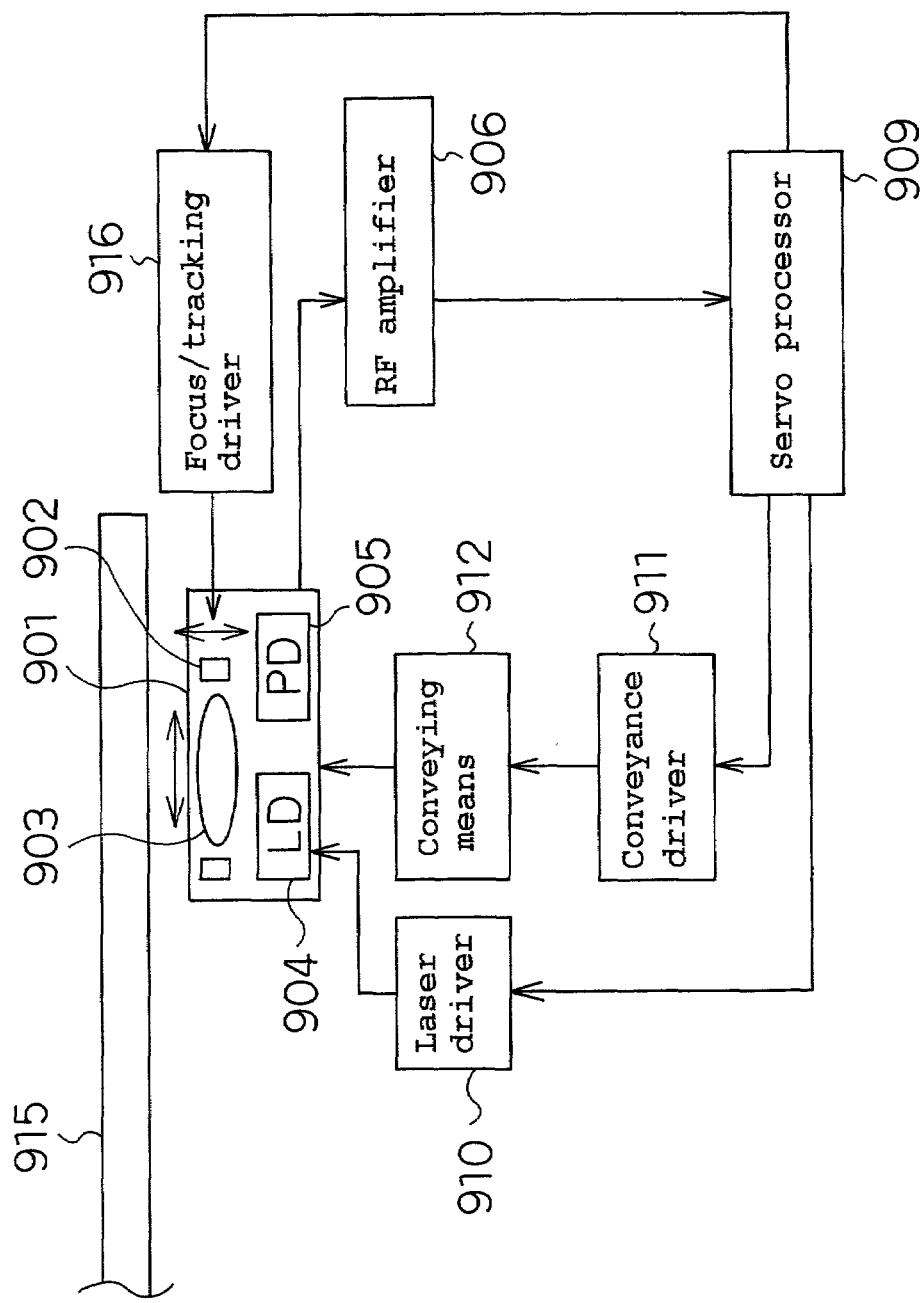
FIG. 9 is a block diagram of an optical disk apparatus according to the prior art.

The configuration and the operation of an optical disk apparatus according to Embodiment 3 is described below with reference to FIG. 8 which is a block diagram of the optical disk apparatus according to the present embodiment. Here, with describing the operation of the optical disk apparatus described also is an embodiment of a method of calculating the amount of lens shift according to the invention.

In contrast to the above-mentioned Embodiment 2 in which the disk tilt DT is obtained from the value of the lens tilt LT realizing the optimum reproduction performance by monitoring the signal amplitude, in Embodiment 3, the signal amplitude detection circuit 501 is replaced by a reproduction jitter detection circuit 801, whereby the disk tilt DT is obtained from the value of the lens tilt LT realizing the optimum reproduction performance by monitoring the reproduction jitter. That is, a system controller 107 can detect the reproduction jitter corresponding to the amount of tilt LT, and accordingly detect the value α of the lens tilt LT causing the minimum reproduction jitter which indicates the optimum reproduction performance. The other points are similar to those in Embodiment 2, and hence detailed description is omitted.

On the basis of the LS obtained as described above, the lens shift correction is carried out similarly to the above-mentioned case. Since the lens tilting scheme is used in Embodiment 3, obtained is a state free from a lens shift as shown in FIG. 6(*b*).

The light source 104 has been mounted on the optical head 101 in the above-mentioned embodiments. However, the invention is not restricted to this, and the light source 104 does not need to be mounted on the optical head 101. Further, the optical head 101 does not depend on a specific configuration of the optical system, specific configurations of the driver circuits, a specific tilt drive scheme, or a specific configuration of the conveying means.

As described above, an example of the invention is an optical disk apparatus comprising:

an optical head having at least: light converging means of converging light from a light source onto an optical disk; and detecting means having a first light-receiving region and a second light-receiving region which are substantially separated from each other by a dividing line corresponding to the rotational direction of said optical disk;

tracking error detecting means of generating a tracking error signal TE/TS from a difference signal TE and a sum signal TS from said detecting means;

tilt driving means of tilting said optical head in a tilt direction in a disk radius direction; and disk tilt detecting means of detecting a disk tilt DT indicating the amount of relative tilt between said optical head and said optical disk; wherein the lens shift LS of said light converging means is detected from the detected value of said tracking error signal TE/TS when said tilt driving means is driven such that said disk tilt DT=0.

The invention has the effect of eliminating the influence of the disk tilt DT and thereby detecting the lens shift LS accurately.

An example of the invention is an optical disk apparatus wherein the state with the disk tilt DT=0 is replaced by the state with the disk tilt DT realizing the optimum reproduction performance. The invention has the effect of detecting the state with the disk tilt DT=0 easily without using a tilt sensor.

An example of the invention is an optical disk apparatus comprising:

an optical head having at least: light converging means of converging light from a light source onto an optical disk; and detecting means having a first light-receiving region and a second light-receiving region which are substantially separated from each other by a dividing line corresponding to the rotational direction of said optical disk;

tracking error detecting means of generating a tracking error signal TE/TS from a difference signal TE and a sum signal TS from said detecting means;

lens tilt driving means of tilting said light converging means in a tilt direction in a disk radius direction; and lens tilt detecting means of detecting a lens tilt LT indicating the amount of tilt of said light converging means; wherein the lens shift LS is detected according to Equation 6 indicating the dependence of the lens shift LS on the value $\alpha$ of the lens tilt LT realizing the optimum reproduction performance of said optical disk, the value $\beta$ of said tracking error signal TE/TS in the state with said lens tilt LT=0, and coefficients a, b, and k proper to said optical head.

$$\beta = a \cdot LS + b \cdot \alpha / k \qquad \text{[Equation 6]}$$

An example of the invention is an optical disk apparatus comprising:

an optical head having at least: light converging means of converging light from a light source onto an optical disk; and detecting means having a first light-receiving region and a second light-receiving region which are substantially separated from each other by a dividing line corresponding to the rotational direction of said optical disk;

tracking error detecting means of generating a tracking error signal TE/TS from a difference signal TE and a sum signal TS from said detecting means;

lens tilt driving means of tilting said light converging means in a tilt direction in a disk radius direction; and disk tilt detecting means of detecting a disk tilt DT indicating the amount of relative tilt between said optical head and said optical disk; wherein the lens shift LS is detected according to Equation 7 indicating the dependence of the lens shift LS on the value $\gamma$ of said disk tilt DT detected by said disk tilt detecting means, the value $\beta$ of said tracking error signal TE/TS in the state with said lens tilt LT=0, and coefficients a and b proper to said optical head.

$$\beta = a \cdot LS + b \cdot \gamma \qquad \text{[Equation 7]}$$

The above-mentioned two inventions have the effect of considering the influence of the disk tilt DT and thereby detecting the lens shift LS accurately.

An example of the invention is an optical disk apparatus wherein the state with the optimum reproduction performance is the state with the maximum signal amplitude.

An example of the invention is an optical disk apparatus wherein the state with the optimum reproduction performance is the state with the minimum reproduction jitter.

The above-mentioned two inventions have the effect of detecting the state with the optimal reproduction performance accurately with a high sensitivity.

An example of the invention is an optical disk apparatus wherein said tracking error signal TE/TS is detected in a mirror region of said optical disk. The invention has the effect of detecting the tracking error signal TE/TS without the influence of the groove shape.

An example of the invention is an optical disk apparatus wherein the tracking error signal TE/TS is detected by measuring the average level of the tracking error signal TE/TS in the OFF state of the tracking control in a data region in the vicinity of the disk radius position where the disk tilt DT or the lens tilt LT is detected. The invention has the effect of providing a method of detecting the tracking error signal TE/TS even in case of an optical disk having no mirror region.

An example of the invention is an optical disk apparatus comprising: conveying means of conveying the optical head substantially in the radius direction of the optical disk; and means of driving the conveying means on the basis of the detected lens shift LS and thereby correcting the lens shift. The invention has the effect of permitting stable tracking control.

Further, in an example of the invention, the initial lens shift is detected. Then, the conveying means 112 continuously carries out conveyance shift of the optical head 101 in the appropriate direction for the lens shift correction on the basis of the detected initial lens shift, for example, after the execution of the tracking control, whereby the lens shift can be corrected.

An example of the invention is a program which causes a computer to execute the function of all or part of the means (or apparatuses, devices, circuits, sections, and the like) of an above-mentioned optical disk apparatus according the invention and works in cooperation with the computer.

An example of the invention is a program which causes a computer to execute the operation of all or part of the steps (or processes, operations, effects, and the like) of an above-mentioned method of calculating the amount of lens shift according the invention and works in cooperation with the computer.

An example of the invention is a computer-readable medium carrying a program for causing a computer to execute all or part of the function of all or part of the means of an above-mentioned optical disk apparatus according the invention, wherein said program having been read out executes said function in cooperation with said computer.

An example of the invention is a computer-readable medium carrying a program for causing a computer to execute all or part of the operation of all or part of the steps of an above-mentioned method of calculating the amount of lens shift according the invention, wherein said program having been read out executes said operation in cooperation with said computer.

Part of the means (or apparatuses, devices, circuits, sections, and the like) according the invention and part of the steps (or processes, operations, effects, and the like) according the invention indicate: a piece or pieces of means among a plurality of pieces of said means and a step or steps among a plurality of said steps; or alternatively, part of function in a piece of means and part of operation in a step, respectively.

The scope of the invention includes also a computer-readable recording medium in which a program according to the invention is recorded.

A mode of use of a program according to the invention may be that the program is recorded in a computer-readable recording medium and works in cooperation with a computer.

A mode of use of a program according to the invention may be that the program is transmitted through a transmitting medium, read out by a computer, and works in cooperation with the computer.

The scope of data structure according to the invention includes a data base, a data format, a data table, a data list, the kind of data, and the like.

The scope of recording media according to the invention includes a ROM and the like, while the scope of transmitting media according to the invention includes a transmitting medium such as the Internet, as well as light, radio waves, acoustic waves, and the like.

An above-mentioned computer according to the invention is not restricted to genuine hardware such as a CPU, and may include firmware, an OS, and peripheral devices.

Further, as described above, the configuration of the invention may be implemented by software or hardware.

As described above, the invention has the advantage of detecting the lens shift accurately, correcting the lens shift, and thereby permitting stable recording and reproduction.

What is claimed is:

1. An optical disk apparatus comprising:
   an optical head having: a lens convergor for converging light from a light source onto an optical disk; and a photodetector for detecting the light thus converged and then reflected from said optical disk;
   a tracking error generator for generating a tracking error signal in order to perform tracking control on the basis of said detected light;
   a detector for detecting a disk tilt DT indicating the amount of tilt of said optical head relative to said optical disk; and
   a calculator for calculating a lens shift LS indicating the amount of shift of said lens means relative to said optical head, according to a predetermined rule on the basis of said generated tracking error signal and said detected disk tilt DT.

2. An optical disk apparatus according to claim 1, wherein said predetermined rule is expressed by the following Equation 1

$$T = a \cdot LS + b \cdot DT \quad [\text{Equation 1}]$$

which is satisfied among: the value T of said generated tracking error signal; said detected disk tilt DT; and said lens shift LS to be calculated; when predetermined constants a and b are given.

3. An optical disk apparatus according to claim 2, wherein said detector detects said disk tilt DT.

4. An optical disk apparatus according to claim 3 comprising optical head driving means of driving said optical head within the cross section in a radius direction of said optical disk on the basis of the result of said detection of said disk tilt DT, wherein
   when said tracking error signal is detected, said optical head is tilted relative to the optical disk so that said detected disk tilt DT substantially becomes zero.

5. An optical disk apparatus according to claim 2, wherein:
   said detects the reproduction state of the information from said optical disk;
   said optical disk apparatus comprises an optical head driver for driving said optical head within the cross section in a radius direction of said optical disk on the basis of the result of said detection of said reproduction state of said information; and
   when said tracking error signal is detected, said optical head is driven so that said reproduction state of said information becomes optimum.

6. An optical disk apparatus according to claim 5, wherein:
   said detection of said reproduction state of said information indicates the detection of the amplitude and/or the jitter of a signal used in the reproduction of said information; and
   said being driven such that said reproduction state of said information becomes optimum indicates being driven so that said amplitude is maximized and/or said jitter is minimized and thereby so that said disk tilt DT substantially becomes zero.

7. An optical disk apparatus according to claim 2, wherein:
   said detecting means can detect (1) a lens tilt LT indicating the amount of tilt of said lens means relative to said optical head and (2) the reproduction state of the information from said optical disk;
   said optical disk apparatus comprises lens driving means of driving the lens center axis of said lens means within the cross section in a radius direction of said optical disk on the basis of the result of said detection;
   in order to detect said disk tilt DT, said lens means is driven so that said reproduction state of said information becomes optimum; and
   said disk tilt DT is detected on the basis of said detected lens tilt LT in the situation that said lens center axis of said lens means has been driven so that said reproduction state of said information becomes optimum.

8. An optical disk apparatus according to claim 7, wherein:
   said detection of said reproduction state of said information indicates the detection of the amplitude and/or the jitter of a signal used in the reproduction of said information;
   said being driven so that said reproduction state of said information becomes optimum indicates being driven such that said amplitude is maximized and/or said jitter is minimized; and after said lens tilt LT is detected in order to detect said disk tilt DT, said tracking error signal is detected in the situation that said lens means has been driven so that said lens tilt LT substantially becomes zero.

9. An optical disk apparatus according to claim 1, wherein said tracking error signal is detected in a mirror region of said optical disk.

10. An optical disk apparatus according to claim 3 or 7, wherein said tracking error signal is detected by detecting an average level of said tracking error signal in an OFF-state of tracking control in a data region in the vicinity of the disk radius position of said optical disk where said disk tilt DT or said lens tilt LT is detected.

11. An optical disk apparatus according to claim 1 comprising a conveyor for conveying said optical head in a radius direction of said optical disk on the basis of said calculated lens shift LS.

12. A method of calculating the amount of lens shift comprising:
 a converging step of converging light from a light source onto an optical disk by means of lens means;
 a detecting step of detecting the light converged onto said optical disk and then reflected from said optical disk;
 a generating step of generating a tracking error signal in order to perform tracking control on the basis of said detected light;
 a disk tilt detecting step of detecting a disk tilt DT indicating the amount of tilt of an optical head having said lens means relative to said optical disk; and
 a calculating step of calculating a lens shift LS indicating the amount of shift of said lens means relative to said optical head, according to a predetermined rule on the basis of said generated tracking error signal and said detected disk tilt DT.

13. A tangible computer readable medium having a program including instructions for causing a computer to perform the steps of;
 generating a tracking error signal in order to perform tracking control on the basis of detected light;
 detecting a disk tilt DT indicating the amount of tilt of an optical head relative to an optical disk; and
 calculating a lens shift LS indicating the amount of shift of a lens relative to said optical head, according to a predetermined rule on the basis of said generated tracking error signal and said detected disk tilt DT.

* * * * *

UNITED STATES PATENT AND TRADEMARK OFFICE
CERTIFICATE OF CORRECTION

PATENT NO. : 7,196,991 B2 Page 1 of 1
APPLICATION NO. : 09/994335
DATED : March 27, 2007
INVENTOR(S) : Junji Nagaoka et al.

It is certified that error appears in the above-identified patent and that said Letters Patent is hereby corrected as shown below:

Column 14
Line 17, after "said" add -- detector --

Column 16
Line 14, change ";" to -- : --

Signed and Sealed this

Fourteenth Day of August, 2007

JON W. DUDAS
*Director of the United States Patent and Trademark Office*